United States Patent
Kim

(12) 
(10) Patent No.: US 6,907,065 B2
(45) Date of Patent: Jun. 14, 2005

(54) REAL/COMPLEX DUAL COMBINATION CHANNEL EQUALIZER

(75) Inventor: Gang-Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 787 days.

(21) Appl. No.: 09/780,358

(22) Filed: Feb. 12, 2001

(65) Prior Publication Data

US 2001/0016004 A1 Aug. 23, 2001

(30) Foreign Application Priority Data

Feb. 12, 2000 (KR) .......................................... 2000/6664

(51) Int. Cl.$^7$ .............................................. H03K 5/159
(52) U.S. Cl. ..................... 375/233; 375/235; 375/350; 708/323; 455/307
(58) Field of Search ............................... 375/232, 233, 375/235, 350; 708/322, 323

(56) References Cited

U.S. PATENT DOCUMENTS 5,673,293 A * 9/1997 Scarpa et al. ............... 375/321
6,426,972 B1 * 7/2002 Endres et al. ............... 375/229
6,671,342 B2 * 12/2003 Lin et al. ..................... 375/375

* cited by examiner

*Primary Examiner*—Dac V. Ha
(74) *Attorney, Agent, or Firm*—Birch, Stewart, Kolasch & Birch, LLP

(57) ABSTRACT

A real/complex dual combination channel equalizer is provided, which is capable of minimizing the complexity of a channel equalizer while maintaining the performance of a real and complex mode. The real/complex dual combination channel equalizer includes a combination of elements for inputting real data and imaginary data to a channel select unit, outputting data selected by the channel select unit, yielding real filter output data and imaginary filter output data by multiplying tap coefficients to the outputted data and performing operations, selecting data among the yielded data, outputting a final data of the real filter by subtracting the value outputted from a real decision orientation filter unit from the selected data, outputting real/complex decision data and an error by the outputted data, and renewing the tap coefficient by the data outputted from the channel select unit and the error.

8 Claims, 5 Drawing Sheets

REAL/COMPLEX DUAL COMBINATION CHANNEL EQUALIZER

BACKGROUND OF THE INVENTION

1. Field of the Invention

The present invention relates to a channel equalizer, in particular to a real/complex dual combination channel equalizer which is capable of minimizing complexity of the channel equalizer by owning resources constructing the real/complex channel equalizer jointly to the maximum while maintaining performance of each mode.

2. Description of the Prior Art

In general, a channel equalizer is for reducing bit detection error by compensating distortion occurred through band-width limited by a plurality of filters used for a transmission/reception terminal and multipath of a transmission channel when a signal is transmitted/received on a digital transmission system such as a high picture quality TV.

Particularly, when a signal transmitted from a transmission terminal is distorted and noise is included, error occurrence probability of a signal received to a reception terminal increases in proportion to increase of a signal level, accordingly a channel equalizer is used on the reception terminal in order to reduce the error occurrence probability by compensating distortion of the received signal.

The channel equalizer is divided into a real channel equalizer and a complex channel equalizer in accordance with a transmission method. The real channel equalizer transmits a transmission signal by putting it on a real channel such as a terrestrial VSB (Vestigial Side band) transmission method.

The complex channel equalizer transmits a signal by putting it separately on a real channel and an imaginary channel such as a cable, a QAM (Quadrature Amplitude Modulation) and a QPSK (Quadrature Phase Shift Keying) transmission method.

However, there are various transmission methods in the present times, a receiver which is capable of operating not the terrestrial or cable transmission method but both methods is required, accordingly the channel equalizer has to compensate distortion of a signal received by the both transmission methods.

The real channel equalizer and complex channel equalizer will now be described as below.

FIG. 1 is a block diagram illustrating a construction of a general real channel equalizer. It comprises a delaying unit 105 for delaying orderly digital data inputted from outside, a multiplying unit 103 for multiplying each tap coefficient Coef to the data outputted from the delaying unit 105, an adding unit 100 for adding a value outputted from the multiplying unit 103 and outputting it, an adder 101 for adding a value outputted from the adding unit 100 to a value outputted from a decision orientation filter unit 106 and outputting equalization data, a determining unit 102 for outputting decision data by the value outputted from the adder 101, a subtracter 104 for finding difference between the value outputted from the determining unit 102 and value outputted from the adder 101 and outputting an error value, a decision orientation filter unit 106 for being inputted the error value of the subtracter 104 and the decision data value outputted from the determining unit 102 and outputting it by performing decision orientation filtering, a multiplier 109 for multiplying the error value outputted from the subtracter 104 to the input data and outputting a step magnitude $\mu$, and an adder 107 for renewing the tap coefficient by the step magnitude outputted from the adder.

The operation of the real channel equalizer will now be described as below.

When the digital data outputted from the transmitter is inputted to the real channel equalizer, the delaying unit 105 passes the inputted digital data orderly to a delayer as same as the number of the number of the tap, and outputs the each delayed data to the multiplying unit 103. The multiplying unit 103 multiples the tap coefficient Coef. to the inputted digital data and the each delayed signal and outputs it. The adding unit 100 adds the outputted each data, and outputs it. The first subtracter 101 subtracts the outputted data and the data outputted from the decision orientation filter unit 106, and outputs it to the determining nit 102. The determining unit 102 outputs data determined by the inputted data. The second subtracter 104 subtracts the determined data and the data subtracted in the first subtracter 101, and yields an error value of the inputted data. The adder 109 yields magnitude of the step by multiplying the yielded error value to the input data. The adder 107 yields a value which renews the tap coefficient by the step magnitude, and outputs it to the multiplying unit 103. The error decreases by compensating distortion of the received data.

FIG. 2 is a block diagram illustrating a construction of a general complex channel equalizer. The construction of the complex channel equalizer is similar to the construction of the real channel equalizer, however algorithm about an imaginary part is added.

The construction of the complex channel equalizer will now be described as below. The complex channel equalizer comprises a real data processing unit for processing real data and an imaginary data processing unit for processing inputted imaginary data.

First, the real data processing unit will now be described. It comprises a delaying unit 205 for delaying the inputted real data orderly, a first operation unit 201 for multiplying a real tap coefficient Real Cpef. to the each delayed data, adding the real tap coefficient added data, and outputting it, a second operation unit 206 for adding separately an imaginary coefficient Imaginary Coef. to the each delayed data, outputting it, and adding the each data, a first subtracter 202 for subtracting the data outputted from the first operation unit 201 from the data outputted from a third operation unit 208, a second subtracter 203 for outputting equalization data by subtracting the data outputted form the subtracter 202 from the data outputted from a real decision orientation filter unit 207, a real determining unit 204 for outputting decision data and a real error value by the data outputted from the second subtracter 203, and a real decision orientation filter unit 207 for being inputted the error value and the decision data value outputted from the real determining unit 204, and performing a decision orientation filtering.

Meanwhile, the construction of the imaginary data processing unit is same with the construction of the real data processing unit. It comprises a delaying unit 212 for delaying the inputted imaginary data orderly, a third operation unit 208 for multiplying an imaginary tap coefficient Real Coef. to the each delayed data and inputted imaginary data, a fourth operation unit 213 for multiplying the real coefficient Real Coef. to the each delayed data and inputted imaginary data, an adder 209 for adding the data outputted from the fourth operation unit to the data outputted from the second operation unit 206, a subtracter 210 for subtracting the data outputted from the adder from the data outputted from an imaginary decision orientation filter unit 214, an imaginary determining unit 211 for outputting decision data value and an error value from the data outputted from the subtracter 210, and the imaginary decision orientation filter unit 214 for being inputted the error value and the decision data value, and performing a decision orientation filtering.

The part renewing the tap coefficient in the above-described complex equalizer will now be described with reference to accompanying FIG. 3.

FIG. 3 is a block diagram illustrating a construction of the tap coefficient renewing part of a general complex channel equalizer. It is constructed with a first and second multipliers 301, 307 for multiplying separately the real data to the error values outputted from the real determining unit 204 and imaginary determining unit 211, a third and fourth multiplier 308, 311 for multiplying separately the imaginary data to the error values outputted from the real determining unit 204 and imaginary determining unit 211, a subtracter 302 for subtracting the value outputted from the first and third multipliers 301, 308, an adder 304 for renewing the tap coefficient of the real data by the magnitude of the step calculated by the subtracted data value, an adder 312 for adding the value of the second and fourth multipliers 307, 311, and a summing amplifier 314 for renewing the tap coefficient of the imaginary data by the magnitude of the step calculated by the added data value.

The operation of the complex channel equalizer is same with the operation of the above-described channel equalizer, accordingly its description will now be abridged.

The construction of the real and complex channel equalizers are similar each other. However, generally the real channel equalizer needs 1 tap filter in order to calculate an output of a filter value of each terminal, and the complex channel equalizer needs 4 taps in order to calculate an output of a filter value of each terminal.

Accordingly, when the complex channel equalizer operates in a real mode, it is impossible to use 3 taps filter on the each terminal, when the real channel equalizer operates in a complex mode, a ghost more far than in a cable use occurs due to influence of an multiplath. In order to compensate the occurred ghost, filter taps of lots of terminals are required, accordingly, the construction of the receiver is complicated.

In addition, when the real/complex channel equalizer is designed independently to the receiver so as to be appropriate to the various transmission methods, the overall construction of the receiver is complicated, and the volume of the receiver increases.

SUMMARY OF THE INVENTION

An object of the present invention is to provide a real/complex dual combination channel equalizer that overcomes the problems and limitations associated with the prior art.

Another object of the present invention is to provide a real/complex dual combination channel equalizer which is capable of minimizing complexity of a receiver by owning construction resources of a real channel equalizer and a complex channel equalizer jointly to the maximum while maintaining performance of the real and complex channel equalizer as it is.

In order to achieve the objects of the present invention, the present invention comprises a channel select unit for outputting selectively real data and imaginary data transmitted from a transmission terminal, a coefficient operation unit for outputting a real filter output value and an imaginary filter output value by multiplying a tap coefficients to each real or imaginary data outputted from the channel select unit, a tap coefficient renewal unit for renewing the tap coefficients, a feed-forward filter output unit for removing precedence interference noise from a signal outputted from the coefficient operation unit, a subtracter for subtracting data outputted from a real decision orientation filter unit from data outputted from the feed-forward filter output unit, a real slicer unit for generating real decision data and a real error by data outputted from the subtracter, a complex real slicer unit for generating complex real decision data and a real error by data outputted from the subtracter, the real decision orientation filter unit for generating a successor interference signal by being inputted the data and error outputted from the real slicer unit and complex real slicer unit, and a complex imaginary slicer unit for generating complex imaginary decision data and an imaginary error according to a signal outputted from the coefficient operation unit.

An embodiment of the present invention comprises inputting real data and imaginary data to the channel select unit, outputting data selected by the channel select unit, yielding real filter output data and imaginary filter output data by multiplying the tap coefficients to the outputted data and performing operation, selecting data among the yielded data, outputting the final data of the real filter by subtracting the value outputted from the real decision orientation filter unit from the selected data, outputting real/complex decision data and an error by the outputted data, and renewing the tap coefficient by the data outputted from the channel select unit and the error.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENT

A real/complex dual combination channel equalizer in accordance with the present invention will now be described in detail with reference to accompanying drawings.

Figure 1:
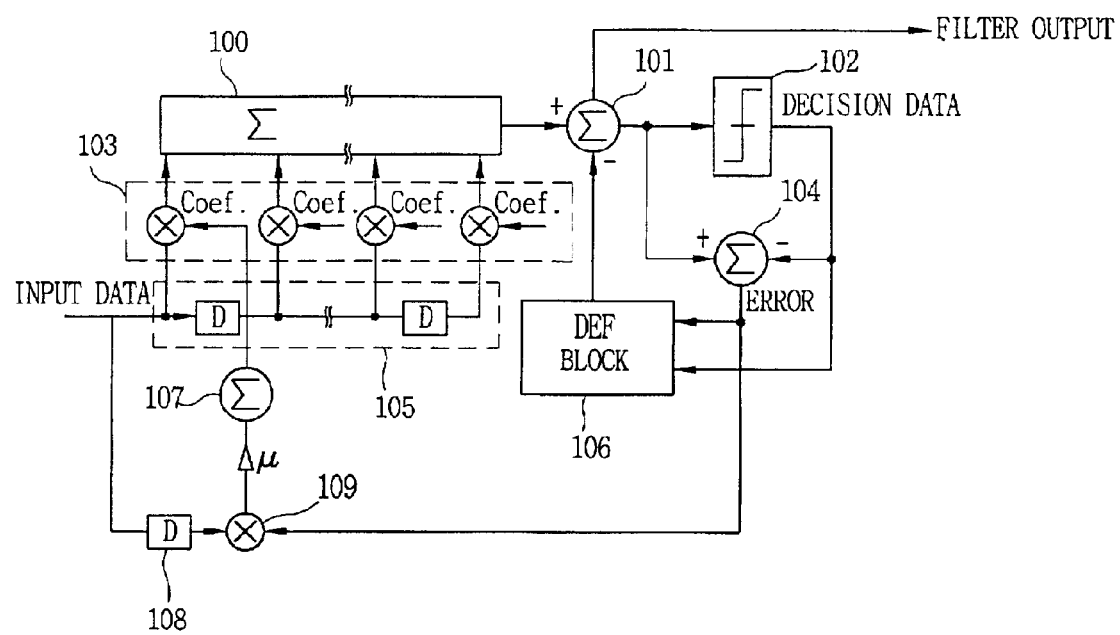
FIG. 1 is a block diagram illustrating a construction of a general real channel equalizer.
Figure 2:
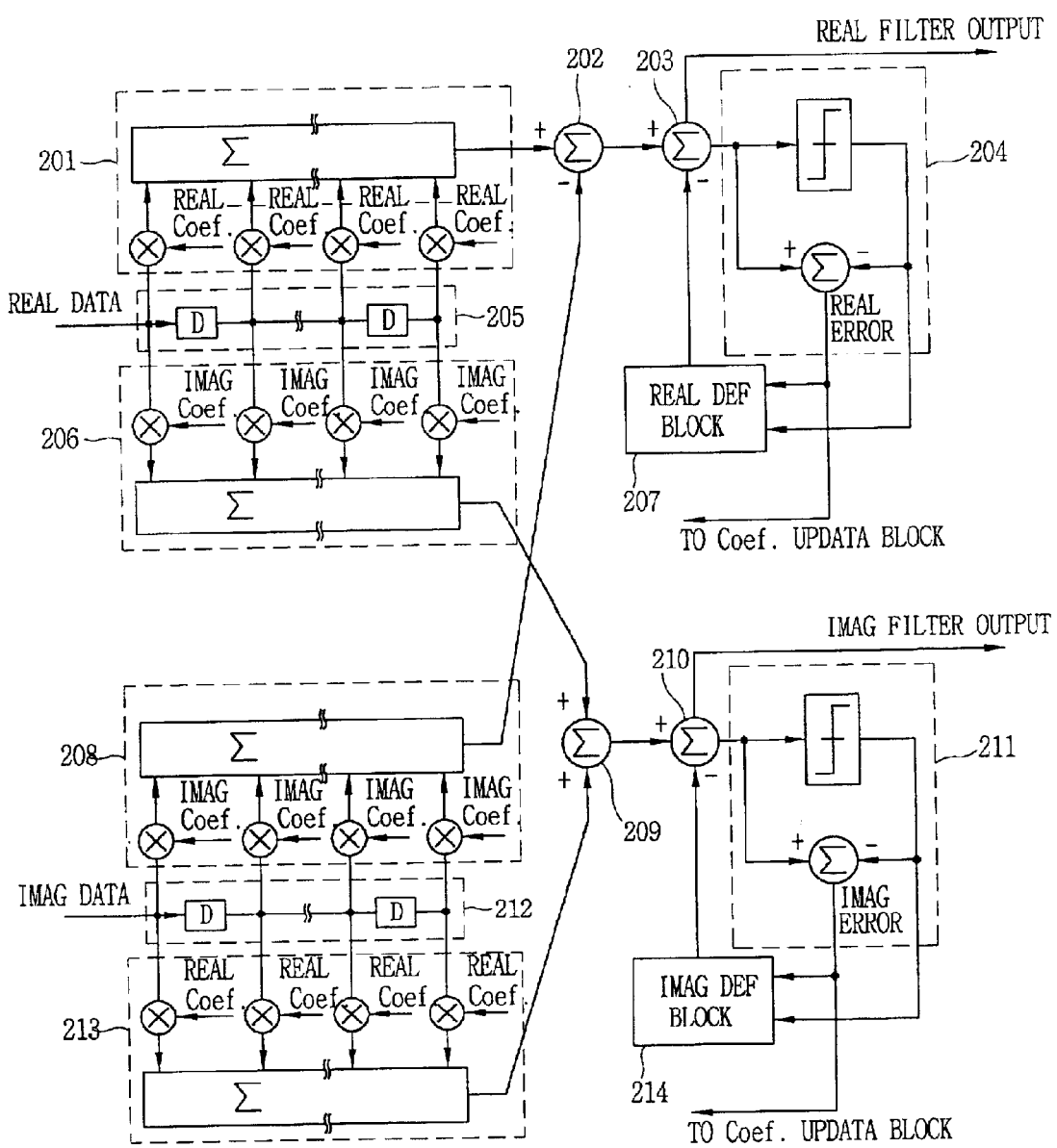
FIG. 2 is a block diagram illustrating a construction of a general complex channel equalizer.
Figure 3:
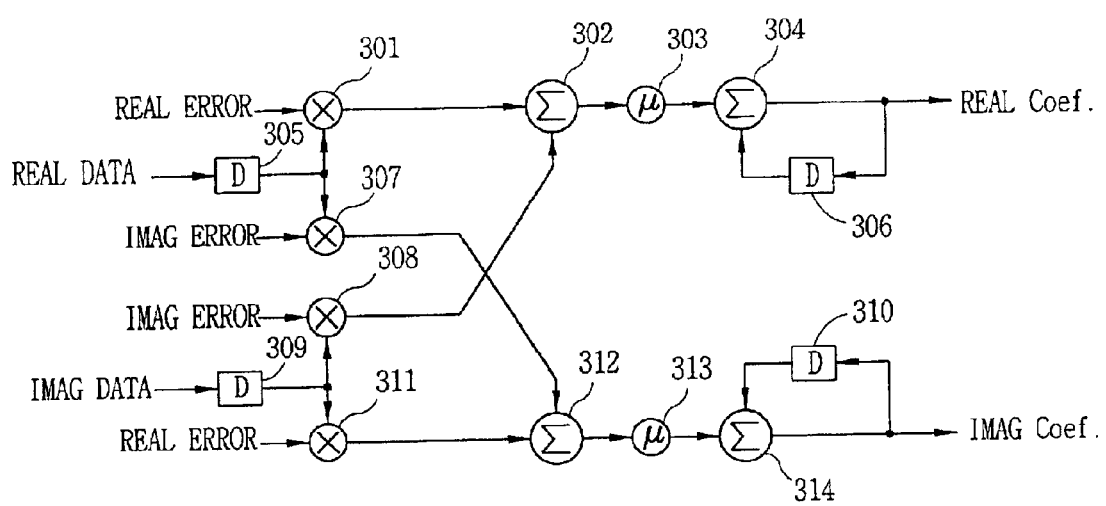
FIG. 3 is a block diagram illustrating a construction of a tap coefficient renewal unit of a general complex channel equalizer.
Figure 4:
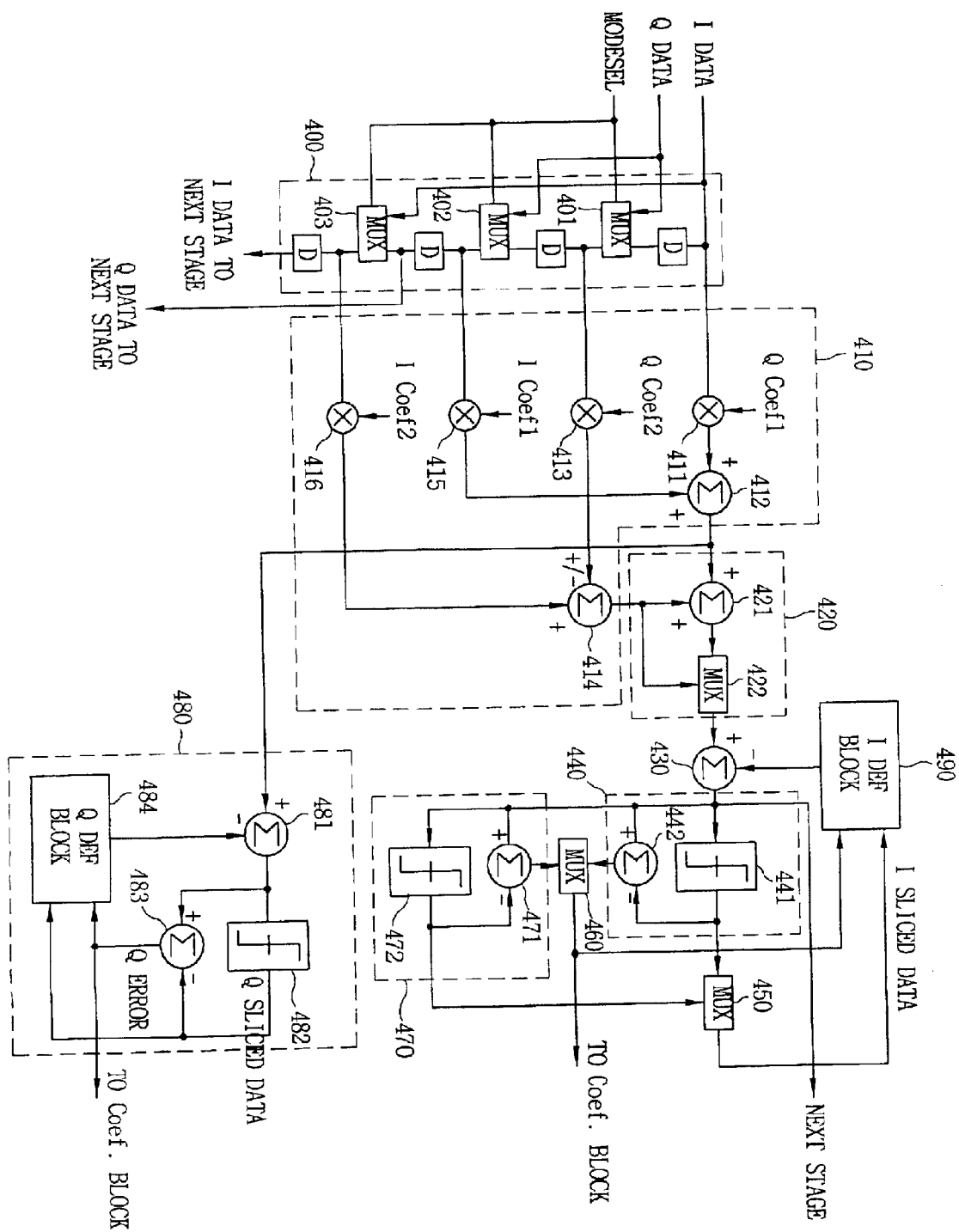
FIG. 4 is a block diagram illustrating a construction of a real/complex dual combination channel equalizer in accordance with an embodiment of the present invention.

FIG. 4 is a block diagram illustrating a construction of a real/complex dual combination channel equalizer in accordance with the present invention. In order to identify a real mode and a complex mode, in the complex mode operation a real signal is called as I (In-Phase), and an imaginary signal is called as Q (Quadrature).

The real/complex dual combination channel equalizer in accordance with the present invention comprises a channel select unit 400 for outputting selectively the transmitted I data and Q data, a coefficient operation unit 410 for multiplying a tap coefficient to the I data or Q data outputted from the channel select unit and outputting it, a feed-forward filter output unit 420 for removing precedence interference noise from a signal outputted from the coefficient operation unit 410, a subtracter 430 for subtracting a signal outputted from a real decision orientation filter unit from the signal outputted from the feed-forward filter output unit, a real slicer unit 440 for generating real decision data and an real error by a signal outputted from the subtracter, a complex I slicer unit 470 for generating complex I decision data and an I error by the signal outputted from the subtracter, a second multiplexer 460 for selecting between the inputted real decision data and complex I decision data, and outputting it, a first multiplexer 450 for selecting among the decision data, real error and I error, and outputting it, an I decision orientation filter unit 490 for generating a successor interference signal by being inputted the decision data and error selected from the first and second multiplexers 450, 460, and a complex Q slicer unit for generating complex Q data and an Q error according to the signal outputted from the coefficient operation unit 410.

The channel select unit 400 comprises a delayer for delaying inputted I data and Q data, and multiplexers 401, 402, 403 for outputting selectively the I data and Q data.

By adding the multiplexers 401, 402, 403 to the filter of a complex channel equalizer, it is operated as a 4steps 1tap filter in the real mode, and it is operated as a 1step 4taps filter in the complex mode.

Accordingly, the complexity of the equalizer decreases by operating as above.

Renewing the tap coefficient in the real/complex dual combination channel equalizer will now be described with reference to accompanying FIG. 5.

Figure 5:
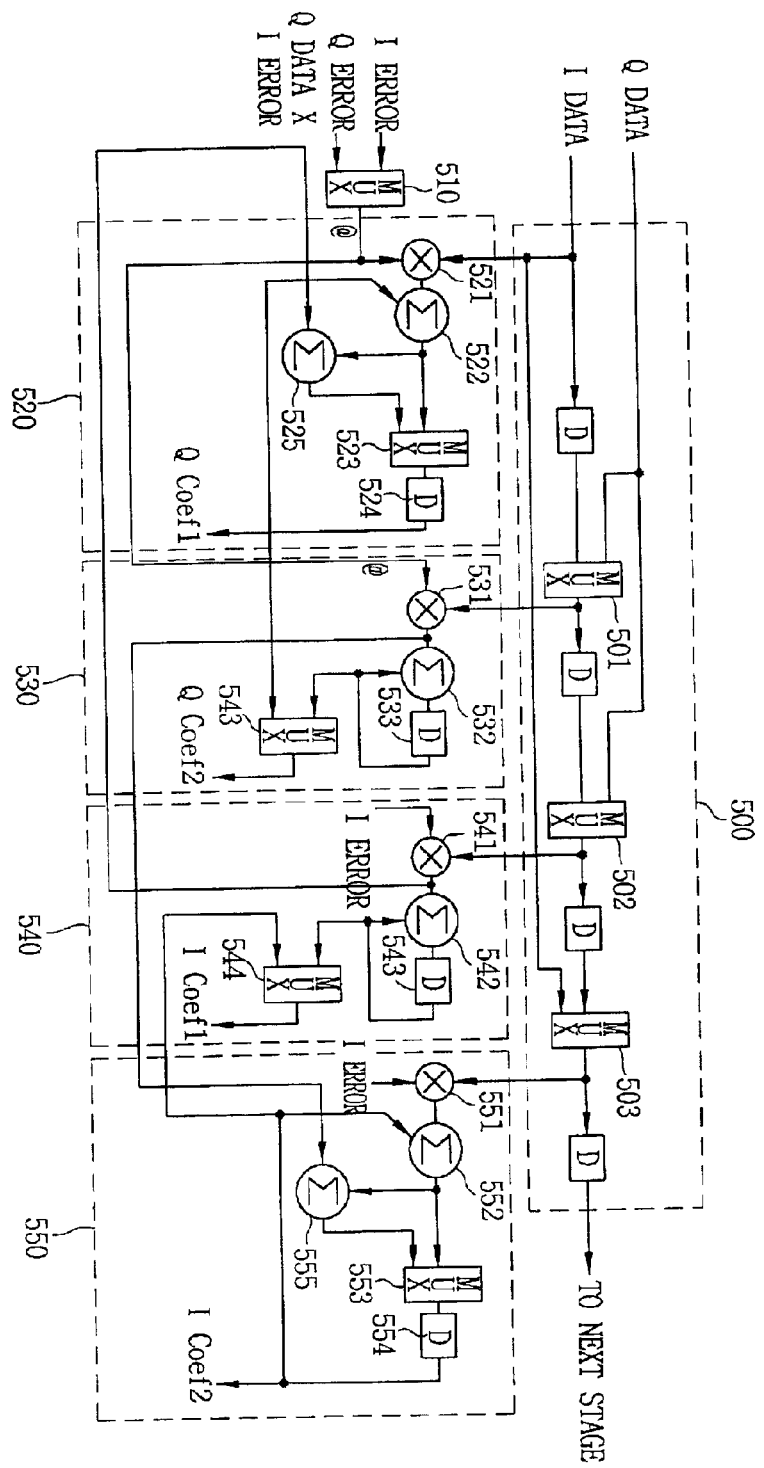
FIG. 5 is a block diagram illustrating a construction of a tap coefficient renewal unit of a real/complex dual combination channel equalizer in accordance with the present invention.

FIG. 5 is a block diagram illustrating a construction of a tap coefficient renewal unit of a real/complex dual combination channel equalizer in accordance with the present invention.

When it is operated as the real or complex mode in accordance with the inputted I data and Q data, it comprises a channel select unit 500 for outputting selectively data delayed by each symbol, when the channel equalizer operates as the real mode, it comprises a first and second tap coefficient output units 520, 530 for outputting a first and a second coefficients by performing the operation of the real data inputted from the channel select unit 500 and real error (I error) inputted from the second multiplexer 460, and a third and a fourth tap coefficient output units 540, 550 for outputting a third and a fourth tap coefficients by performing the operation of the inputted real error and real data.

When the channel equalizer operates as the complex mode, the first and second tap coefficients output units 520, 530 output the first and second tap coefficients by subtracting the value found by performing the operation of the imaginary data and real data from the value found by performing the operation of the real data and imaginary error, and the third and fourth tap coefficients output units 540, 550 output the third and fourth tap coefficients by adding a value found by performing the operation of the real data and real error to a value found by performing the operation of the imaginary data and imaginary error.

The operation of the real/complex dual combination channel equalizer will now be described in detail with reference to accompanying FIGS. 4 and 5.

First, the real mode operation of the real/complex dual combination channel equalizer will now be described.

In general, because the real channel equalizer transmits data through the I channel, only I data is inputted to the real/complex dual combination channel equalizer. When the I data is inputted, multiplexers 401, 402, 403 of the channel elect unit 400 output real data separately delayed through a delayer by a Mode select signal (ModeSEI). The mode select signal is a signal for selecting a signal inputted to the nultiplexers. The outputted real data are separately multiplied to tap coefficients (Q Coef. 1, Q Coef.2, I Coef.1, I Coef.2) outputted from the tap coefficient renewal unit (depicted in FIG. 5), and are added each other.

In other words, a Q filter value is outputted by adding the value multiplying the inputted I data to the 1 Q tap coefficient (Q Coef.1) to the value adding the 2 symbol delayed I data to the first I tap efficient (I Coef. 1) on the first adder 420. In addition, the I filter value is outputted by adding the value multiplying the 1 symbol delayed I data to the second Q tap coefficient (Q Coef.2) to the second I tap coefficient (I Coef.2) on the second adder 414.

Because the real channel equalizer is all real data, the all data outputted from the I filter and outputted from the Q filter are real data.

Because all the data outputted from the coefficient operation unit 410 are real data, the multiplexer 422 of the feed-forward filter unit selects and outputs the data added on the third adder 421.

The final data of the filter is outputted by subtracting the data outputted from the I decision orientation filter unit 490 from the outputted data.

The outputted value is separately inputted to the real slicer unit 440 and complex I slicer unit 470. When the data is inputted to the real slicer unit 440, the real decision unit 441 outputs real decision data, and the subtracter 442 outputs an real error by subtracting the filter output data from the real decision data. The complex I slicer unit 470 outputs complex I decision data and I error.

When the outputted real and complex I error are inputted to the multiplexer 460, the multiplexer 460 selects the real error, and outputs it to the tap coefficient renewal unit (depicted in FIG. 5) and I decision orientation filter unit 490.

As described above, when the I data is inputted, the channel select unit 500 outputs the each delayed I data selected from the multiplexers 501, 502, 503. The real error outputted from the multiplexer 460 depicted in FIG. 4 is inputted to the first tap coefficient output unit 520 passing through the multiplexer 510. The inputted real error is multiplied to the I data in the multiplier 521. The multiplied value is added to the stored 1 Q tap coefficient value. The added value is selected in the multiplexer 523, and the first tap coefficient is outputted through the tap coefficient output terminal (Q Coef.1).

The data outputted from the multiplexer 510 is inputted to the second tap coefficient output unit 530. The second tap coefficient (Q Coef.2) is outputted by the 1 symbol delayed real data and operation.

As described above, also the third and fourth tap coefficient output units 540, 550 output the third and fourth tap coefficients by being inputted the delayed real data and real error.

When the real/complex dual combination channel equalizer operates as the real mode, a coefficient renewal equation and a filter output equation can be described as below.

$$C_{k+1} = C_k + \mu E_k D_k \qquad \text{[Equation 1]}$$

$$Y(n) = \sum_k D_k C_k \qquad \text{[Equation 2]}$$

Herein, $C_{k+1}$ is a filter tap coefficient of the equalizer at the next time, $C_k$ is a filter tap coefficient of the equalizer at the present time, $\mu$ is a magnitude of a step, $E_k$ is an error value of the equalizer at the present time, $D_k$ is data stored in the filter tap at the present time, and $Y(n)$ is filter output data.

As dexcribed above, it is possible to decreae the complexity of the receiver while maintaining the performance of the general real channel equalizer by using the 1 step 4 taps fileter as the 4 steps 1 tap filter in the complex channel equalizer by the multiplexer.

The operation in the complex mode of the real/complex dual combination channel equalizer will now be described.

When the real data (I data) and imaginary data (Q data) are inputted to the channel select unit 400, the imaginary data is inputted to the first and second multiplexers 401, 402, and the real data is inputted to the third multiplexer 403. The I filter output value and Q filter output value are outputted by performing addition and subtraction mutually same with the above-described real mode with values found by multiplying the tap coefficients (Q Coef.1, Q Coef.2, I Coef.1, I Coef.2) outputted from the tap coefficient renewal unit (depicted in FIG. 5) to the each data outputted from the multiplexer.

Only, in the complex mode, performing the subtraction in the adder 414 is differentiated from the operation of the real mode.

The outputted I filter output value and Q filter output value are inputted to the feed-forward filter output unit 420. The multiplexer 422 of the filter output unit 420 selects the Q filter output value and outputs it. A value found by subtracting the value outputted from the I decision orientation filter unit 490 from the Q filter output value outputted from the output value 420 of the I feed-forward filter 420 is the final output of the I filter.

The output value of the outputted I filter is separately inputted to the real slicer unit 440 and the complex I slicer unit 470. The real slicer unit 440 outputs the real decision data and real error when the data is inputted. The complex I slicer unit 470 outputs the complex I decision data and I error.

The operation of the real slicer unit 440 and complex I slicer unit is described in the real mode, and it will now be abridged.

When the outputted real error and I error are inputted to the multiplexer 460, the multiplexer 460 selects the I error, and inputs it to the tap coefficient renewal unit (depicted in FIG. 5) and I decision orientation filter 490.

When the real deicision data and complex I decision data are inputted to the multiplexer 450, the multiplexer 450 selects the complex I decision data, and outputs it to the I decision orientation filter unit 490.

According to the above-mentioned method, the I decision data and I error are generated. A method for generating the Q decision data and Q error of the complex mode is similar to the method of the real mode, and it will now be described summarily.

The value is outputted by subtracting the value outputted from the Q decision orientation filter unit 484 from the Q filter output value outputted from the coefficient operation unit 410 on the subtracter 481 of the complex Q slicer unit 480. The outputted value is inputted to the Q decision unit 483 and subtracter 484, and the Q decision data and Q error are generated.

The generated Q error is inputted to the tap coefficient renewal unit (depicted in FIG. 5) and Q decision orientation unit 484.

When the I data and Q data are inputted to the channel select unit 500 of the tap coefficient renewal unit, the first and second multiplexers 501, 502 select and output the imaginary data, and the third multiplexer 503 select and output the real data.

When the I error outputted form the complex I slicer unit and Q error outputted from the complex Q slicer are inputted to the multiplexer 510, the multiplexer 510 selects the Q error, and outputs it to the first tap coefficient output unit 520.

The first tap coefficient output unit multiplies the Q error to the I data outputted form the channel select unit 500, and adds it to the stored tap coefficient value. The added value is inputted to the multiplexer 523 and subtracter 525. The subtracter 525 subtracts the value found by multiplying the Q data to the I error from the inputted value, and outputs it to the multiplexer 523.

The value outputted from the multiplexer 523 is delayed by the delayer 524, and is inputted to the multiplexer 534 of the second tap coefficient output unit 530. In addition, the outputted value is the first tap coefficient (Q Coef.1).

When the Q data and Q error are inputted to the second tap coefficient output unit 530, the second tap coefficient output unit 530 multiplies the Q data to the Q error, and adds the value, and inputs the value to the multiplexer 534. The multiplexer 534 selects the value inputted from the first tap coefficient output unit 530 as the second tap coefficient (Q Coef.2), and outputs it.

The third tap coefficient output unit 540 performs the operation of the Q data and I error, and inputs it to the multiplexer 544, the multiplexer 544 selects the second tap coefficient value outputted form the fourth tap coefficient output unit 550, and outputs the first tap coefficient (I Coef.1).

The fourth tap coefficient output unit 550 multiplies the inputted I data to the I error, and outputs it. The outputted value is added to the stored coefficient value, and is outputted to the multiplexer 553 and adder 555. The adder 555 adds the outputted value to a value found by multiplying the Q data to the Q error, and inputs it to the multiplxer 553. The multiplexer 553 selects the added value, and outputs it as the second tap coefficient (I Coef.2).

The value selected by the multiplexer 553 is inputted to the multiplexer 544 of the third tap coefficient output unit 540, is selected as the second tap coefficient (I Coef.2), and is outputted.

The coefficient renewal equation and filter output equation in the complex mode operation can be described as below.

$$C_{k+1} = \left(C_k^I + \mu\left(D_k^I E_k^I + D_k^Q E_k^Q\right)\right) + j\left(C_k^Q + \mu\left(D_k^I - D_k^Q\right)E_k^I\right) \quad \text{[Equation 1]}$$

$$Y(n) = \sum_k \left(D_k^I D_k^I - D_k^Q C_k^Q\right) + j\sum_k \left(D_k^I C_k^Q + D_k^Q C_k^I\right) \quad \text{[Equation 2]}$$

Herein, $C_{k+1}$ is a filter tap coefficient of the equalizer at the next time.

$C_k^I$ is an I filter tap coefficient of the equalizer at the present time.

$C_k^Q$ is a Q filter tap coefficient of the equalizer at the present time.

$\mu$ is a step magnitude.

$E_k^I$ is an I error value of the equalizer at the present time.

$E_k^Q$ is a Q error value of the equalizer at the present time.

$D_k^I$ is data stored in the I filter tap at the present time.

$D_k^Q$ is data stored in the Q filter tap at the present time.

Y(n) is filter output data.

As described above, the present invention is capable of minimizing the complexity of the receiver by owning construction resources jointly to the maximum while maintaining the performance of the real and complex channel equalizer as it is.

The invention being thus described, it will be obvious that the same may be varied in many ways. Such variations are not to be retarded as a departure from the spirit and scope of the invention, and all such modifications as would be obvious to one skilled in the art are intended to be included within the scope of the following claims.

What is claimed is:

1. A real/complex dual combination channel equalizer, comprising:

a channel select unit for outputting selectively real data and imaginary data transmitted from a transmission terminal;

a coefficient operation unit for outputting real filter output values and an imaginary filter output value by multiplying each real or imaginary data outputted from the channel select unit to a tap coefficient;

a tap coefficient renewal unit for renewing the tap coefficient;

a feed-forward filter output unit for removing precedence interference noise from a signal outputted from the coefficient operation unit;

a subtracter for subtracting data outputted from a real decision orientation filter unit from data outputted from the feed-forward filter output unit;

a real slicer unit for generating real decision data and a real error by data outputted from the subtracter;

a complex real slicer unit for generating complex real decision data and a complex real error by the data outputted from the subtracter;

a real decision orientation filter unit for generating a successor interference signal by being inputted the data and error outputted from the real slicer unit and complex real slicer unit; and a complex imaginary slicer unit for generating complex imaginary decision data and an imaginary error according to a signal outputted from the coefficient operation unit.

2. The real/complex dual combination channel equalizer according to claim 1, wherein the channel select unit comprises:

a multiplexer for selecting the inputted real data and imaginary data; and a delayer for delaying the inputted real data.

3. The real/complex dual combination channel equalizer according to claim 2, wherein the real/complex dual combination channel equalizer operates as 4 steps 1 tap in a real mode, and operates as 1 step 4 taps in a complex mode.

4. The real/complex dual combination channel equalizer according to claim 1, wherein the feed-forward filter output unit comprises:

an adder for adding the real filter output values to the imaginary filter output value; and a multiplexer for selecting the value outputted from the adder and real filter output values and outputting them.

5. The real/complex dual combination channel equalizer according to claim 1, wherein the tap coefficient renewal unit comprises:

the channel select unit for outputting selectively inputted real data and imaginary data as symbol data corresponding to a real/complex mode; and a tap coefficient output unit for outputting a tap coefficient by operating the real error and complex real error selected in accordance with the data outputted from the channel select unit and real/complex mode.

6. The real/complex dual combination channel equalizer according to claim 5, wherein the tap coefficient output unit comprises:

first and second imaginary tap coefficient output units for outputting first and second imaginary tap coefficients; and third and fourth real tap coefficient output units for outputting third and fourth real tap coefficients.

7. A real/complex dual combination channel equalizing method, comprising:

inputting real data and imaginary data to a channel select unit;

outputting data selected by the channel select unit;

yielding real filter output data and imaginary filter output data by multiplying tap coefficients to the outputted data and performing an operation;

selecting and outputting imaginary filter output among the outputted data;

outputting a final data of the real filter by finding a value by subtracting a value outputted from a real decision orientation filter unit from the outputted data;

outputting complex real data and error by the outputted data;

outputting complex imaginary decision data and error by the outputted imaginary filter output; and renewing a tap coefficient by the data outputted from the channel select unit and the complex real error and imaginary error.

8. The real/complex dual combination channel equalizing method according to claim 7, wherein the renewing process comprises the steps of:

outputting first and second tap coefficients by subtracting a value found by performing the operation of the complex imaginary data and imaginary error from a value found by performing the operation of the real data and the complex imaginary error outputted from the channel select unit; and outputting third and fourth tap coefficients by adding a value found by performing the operation of the real data and the complex real error outputted from the channel select unit to a value found by multiplying the imaginary data to the complex imaginary error.

* * * * *